United States Patent [19]

Kennedy, Jr.

[11] 4,113,286
[45] Sep. 12, 1978

[54] HANGER FOR PIPE

[75] Inventor: Harold Kennedy, Jr., Birmingham, Ala.

[73] Assignee: United States Pipe and Foundry Company, Birmingham, Ala.

[21] Appl. No.: 856,384

[22] Filed: Dec. 1, 1977

Related U.S. Application Data

[63] Continuation-in-part of Ser. No. 724,061, Sep. 17, 1976, abandoned.

[51] Int. Cl.² .............................................. F16L 3/00
[52] U.S. Cl. ...................................... 285/61; 248/62; 285/236
[58] Field of Search ................... 285/61, 236; 248/62, 248/58

[56] References Cited

U.S. PATENT DOCUMENTS

| 883,673 | 3/1908 | Shepard | 248/62 |
|---|---|---|---|
| 1,362,244 | 12/1920 | Farley | 248/62 X |
| 2,725,207 | 11/1955 | Roth et al. | 248/62 |
| 2,741,509 | 4/1956 | Melcher | 285/61 X |
| 3,194,590 | 7/1965 | Cook | 285/61 |
| 3,211,475 | 10/1965 | Freed et al. | 285/236 |
| 3,414,262 | 12/1968 | Lounsbury | 248/62 |
| 3,933,377 | 1/1976 | Arrowood | 285/236 X |
| 4,026,586 | 5/1977 | Kennedy, Jr. et al. | 285/61 X |

FOREIGN PATENT DOCUMENTS

| 207,708 | 9/1966 | Sweden | 248/62 |
|---|---|---|---|
| 414,278 | 12/1966 | Switzerland | 248/62 |

*Primary Examiner*—Thomas F. Callaghan
*Attorney, Agent, or Firm*—James W. Grace

[57] ABSTRACT

A pipe hanger for hanging pipe lines joined with a coupling which employs a sleeve type gasket encircled and clamped with a flexible metal band and which utilizes bolts to provide the clamping force. The hanger strip is so constructed that it allows use of the clamping force to force the vertical leg of the hanger strip against the gasket, thus creating pre-compression of the gasket at this critical location.

5 Claims, 3 Drawing Figures

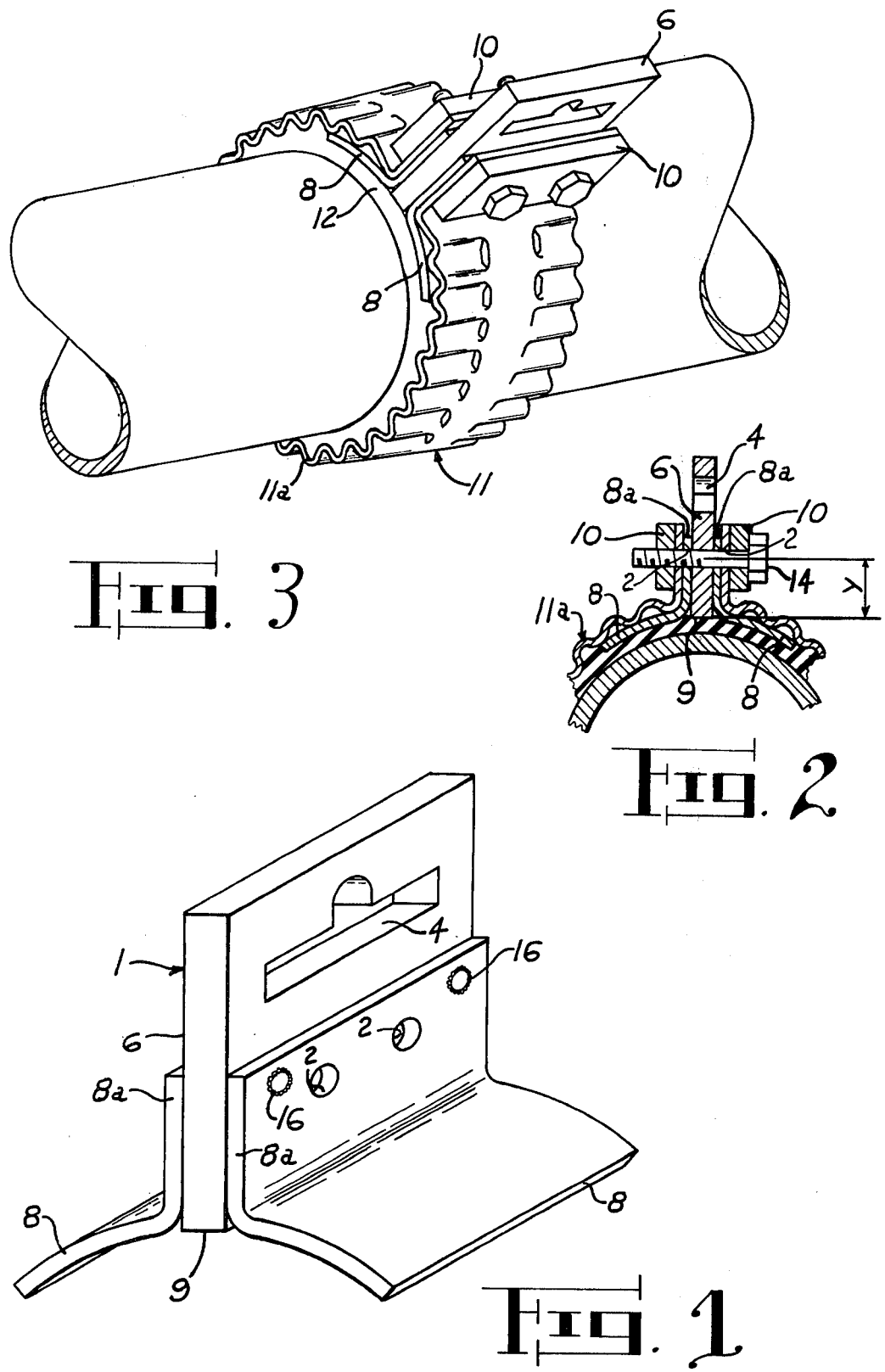

HANGER FOR PIPE

This application is a continuation in part of U.S. application Ser. No. 724,061 filed Sept. 17, 1976 and now abandoned.

BACKGROUND OF THE INVENTION

1. Field of the Invention

This invention is in the field of pipe hangers. More specifically a hanger for suspending plain end soil pipes which are joined with a flexible metal strip clamped around a sleeve type gasket wherein bolts are used to apply the clamping force.

2. Description of the Prior Art

Pipe lines are suspended using a variety of devices, some of which encircle all or most of the pipe circumference. Also, there are known pipe hangers which utilize elements of the pipe joining device to suspend the pipe line.

SUMMARY OF THE INVENTION

The present invention comprises a metal hanger strip having three legs. When placed in its usable position, one leg extends vertically upward and the other two legs extend outwardly almost horizontally but in opposite directions to each other. The vertical leg has an aperture for receiving a hanger rod or strap and holes corresponding to those provided for bolts in the ends of the clamping strap. When the bolts are tightened, a radial force is exerted against the gasket around its entire periphery and an additional precompression is exerted in the area under the vertical leg of the hanger strip. This allows the weight of the pipe line to be supported by the hanger without entirely removing gasket compression in the area under the hanger. Removal of all compression from a portion of the gasket could, or course, prevent sealing.

DESCRIPTION OF THE DRAWING

FIG. 1 is a perspective view of the preferred hanger strip.

FIG. 2 is a cross-sectional elevation showing a hanger strip in relation to the clamping strap.

FIG. 3 is a perspective view showing two pipes joined together and a hanger strip installed.

DESCRIPTION OF THE PREFERRED EMBODIMENT

Referring to the drawing, and more specifically to FIG. 1, there is shown the preferred hanger strip indicated generally by the numeral 1. The hanger strip should be made from a resilient material, such as steel, in the form of a central upright leg 6 with legs 8 extending outwardly from each side at the lower edge of leg 6. For support, legs 8 have upwardly extending vertical portions 8a which may be welded to their respective sides of upright leg 6. Upright leg 6 has a bottom base edge extending coplanar with the lower surface of legs 8 where they attach to leg 6. Holes may be drilled into vertical leg 6 through legs 8a and a slot 4 is punched into leg 6 near its upper edge. Outwardly extending legs 8 are slightly curved to conform to the shape of the pipe.

A clamping strap 11 which is a metal strap having spaced corrugations 11a along each edge thereof forms a support means for the pipes. Strap 11 is wrapped around the pipe ends which are abutting each other. A sealing gasket of rubber or other elastromeric material, such as vinyl plastic, is wrapped around the pipe joint between the outer surfaces of the pipes and the inner surface of the strap 11. Strap 11 is placed over the upper horizontal and vertical surfaces of legs 8 and 8a to extend above holes 2. Holes may be drilled in strap 11 to correspond with holes 2 of legs 8a.

For reinforcing and strengthening the ends of strap 11, metal plates 10 may be secured thereto by welding or the like.

To use the hanger strip 1, its vertical leg 6 is placed between the ends 10 of the clamping strap 11, and which clamping strap 11 has been placed around sealing gasket 12, both clamping strap 11 and gasket 12 being well-known in the art. Clamping bolts 14 are inserted and tightened, thus also securing legs 8 of hanger strip 1 between gasket 12 and clamping strap 11. While the drawing shows the base 9 of vertical leg 6 is substantially coplanar with the interior surfaces of legs 8, it is preferred that the base 9 extend interiorly of the arc formed by the outwardly and downwardly extending legs 8. It is also very significant that the base 9 of vertical leg 6 along with outwardly extending legs 8 have been forced against gasket 12 precompressing gasket 12 more than where only clamping strap 11 makes contact therewith. This additional precompression of gasket 12 prevents removal of the total precompression when the weight of the pipe line suspends from hanger strip 1. In order to assure this important additional precompression, the size of holes 2 and the distance Y from the center of the holes 2 to the base 9 of vertical leg 6 must be closely controlled. Also, to make the hanger strip easier to install, legs 8 should be attached to leg 6 by spot welding at spots 16 or by other suitable means such as riveting or bolting. The pipe so joined can be suspended from a convenient support by placing a strap, rod or other tension member through slot 4 and attaching the tension member to the support.

Hanger strip 1 could, or course, be made from one piece of metal or other suitable material but is preferably made by attaching vertical leg 6 to the two legs 8 by welding or other suitable means.

I claim:

1. In combination, a pair of plain end pipes arranged in end to end relationship and generally horizontal, a sleeve type resilient gasket completely surrounding the abutting pipe ends, a metal band substantially surrounding said resilient gasket, said metal band having free ends and each free end having an upwardly extending portion, a hanger strip adapted to be clamped between said upwardly extending portions of said free ends, said hanger strip having a central upright leg with an upper and lower end and a pair of legs with one end of each leg extending upwardly adjacent said central upright leg and the other end of each of said pair of legs extending outwardly in an opposite and downwardly arcuate direction forming an arc underneath said free ends of said metal band and the lower end of said central upright leg extending interiorly of the arc formed by said other ends of said pair of legs, and means for clamping said hanger strip between said free ends of said metal band whereby the lower end of said central upright leg compresses said resilient gasket more than does said metal band.

2. The combination of claim 1 wherein an opening is provided in the upper end of said central upright leg.

3. In combination, a pair of plain end pipes arranged in end to end relationship and generally horizontal, a sleeve type resilient gasket completely surrounding the abutting pipe ends, a metal band substantially surrounding said resilient gasket, said metal band having free ends and each free end having an upwardly extending portion, a hanger strip adapted to be clamped between said upwardly extending portions of said free ends, said hanger strip having a central upright leg with an upper and lower end and a pair of legs with one end of each leg extending upwardly adjacent said central upright leg and the other end of each of said pair of legs extending outwardly in an opposite and downwardly arcuate direction forming an arc underneath said free ends of said metal band and the lower end of said central upright leg being substantially coplanar with the interior surfaces of said other ends of said pair of legs, and means for clamping said hanger strip between said free ends of said metal band whereby the said other ends of said pair of legs and the lower end of said central upright leg compresses said resilient gasket more than does said metal band.

4. A pipe hanger for use with plain end pipes wherein a pair of plain end pipes are in substantially abutting relation on a common center line, comprising a sleeve type resilient gasket adapted to be wrapped around and covering each of said ones of said pair of pipes, a gasket adapted to cover said gasket, said metal band having free ends, a hanger strip adapted to be clamped between said free ends of said band, said hanger strip having a central upright leg with an upper and lower end and a pair of legs with one end of each leg extending upwardly adjacent said central upright leg and the other end of each of said pair of legs extending outwardly in an opposite and downwardly arcuate direction forming an arc underneath said free ends of said metal band and the lower end of said central upright leg extending interiorly of the arc formed by said other ends of said pair of legs, and means for clamping said hanger strip between said free ends of said metal band whereby the lower end of said central upright leg compresses said resilient gasket more than does said metal band, when said pipe hanger is connected to said pair of pipes.

5. A pipe hanger for use with plain end pipes wherein a pair of plain end pipes are in substantially abutting relation on a common center line, comprising a sleeve type resilient gasket adapted to be wrapped around and covering each of said ones of said pair of pipes, a metal band adapted to cover said gasket, said metal band having free ends, a hanger strip adapted to be clamped between said free ends of said band, said hanger strip having a central upright leg with an upper and lower end and a pair of legs with one end of each leg extending upwardly adjacent said central upright leg and the other end of each of said pair of legs extending outwardly in an opposite and downwardly arcuate forming an arc underneath said free ends of said metal band and the lower end of said central upright leg being substantially coplanar with the interior surfaces of said other ends of said pair of legs, and means for clamping said hanger strip between said free ends of said metal band whereby the said other ends of said pair of legs and the lower end of said central upright leg compresses said resilient gasket more than does said metal band, when said pipe hanger is connected to said pair of pipes.

* * * * *

UNITED STATES PATENT OFFICE
CERTIFICATE OF CORRECTION

PATENT NO. : 4,113,286
DATED : September 12, 1978
INVENTOR(S) : Harold Kennedy, Jr.

It is certified that error appears in the above-identified patent and that said Letters Patent are hereby corrected as shown below:

Column 3, line 24, "gasket" should be --metal band--.

Signed and Sealed this

Sixth Day of March 1979

[SEAL]

Attest:

RUTH C. MASON
Attesting Officer

DONALD W. BANNER
Commissioner of Patents and Trademarks